Nov. 6, 1945.  R. W. HEWES  2,388,484
OSCILLATING CODE TRANSMITTER
Filed Jan. 21, 1943
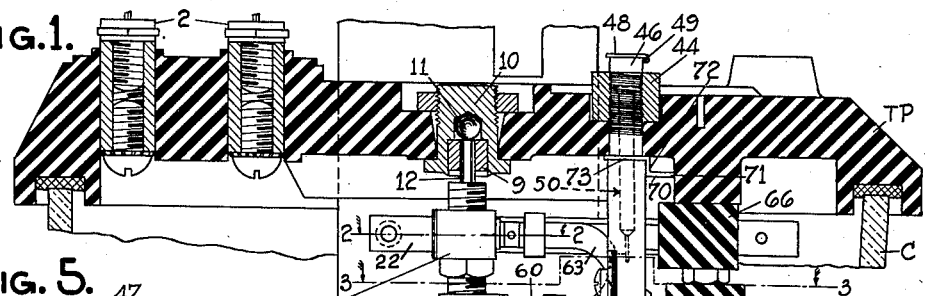
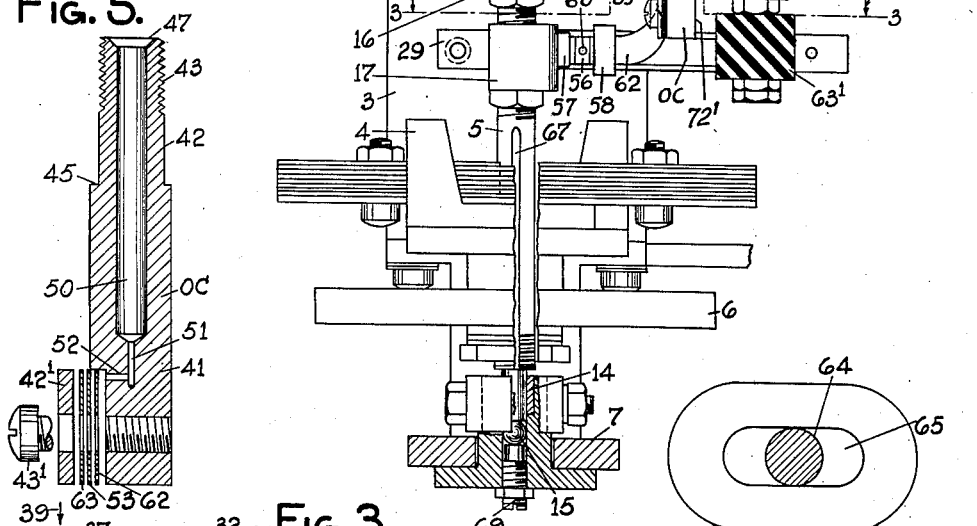
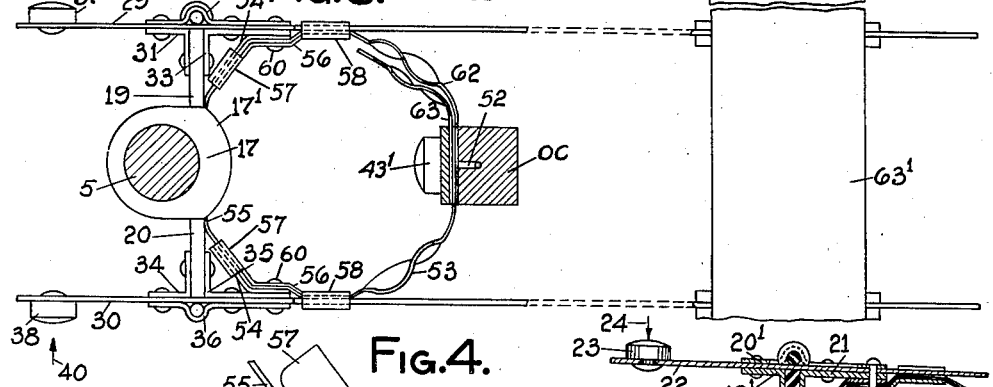
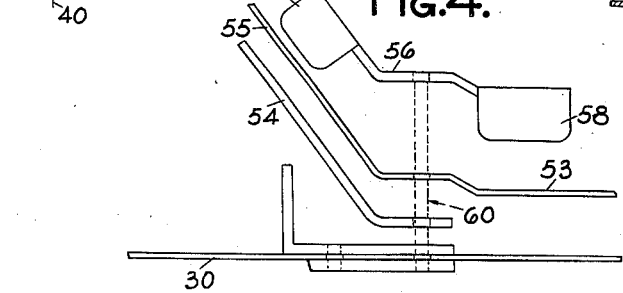
INVENTOR,
R. W. Hewes,
BY Neil W. Preston,
his ATTORNEY Patented Nov. 6, 1945

2,388,484

UNITED STATES PATENT OFFICE 2,388,484

OSCILLATING CODE TRANSMITTER

Ralph W. Hewes, Rochester, N. Y., assignor to General Railway Signal Company, Rochester, N. Y.

Application January 21, 1943, Serial No. 473,100

5 Claims. (Cl. 184—102)

This invention relates, in general to coders of the oscillating type which are particularly adapted for use in railway control systems, and has more particular reference to an improved lubrication system for such coders.

In coders of the type to which this invention relates, as, for example, disclosed in the Field Patent No. 2,351,588, dated June 20, 1944, the various moving parts are not readily accessible without some danger of disturbing the adjustment of the device. Also, in the interest of economy, such devices are not highly powered, and hence cannot tolerate excessive friction and wear such as might result from a failure to be properly lubricated.

Also, if it be necessary to gain access to the inner parts of the device for frequent oiling, there would be danger of disturbing the adjustments which determine the periodicity of the oscillations, which adjustments must be relatively close so as to maintain the various codes sufficiently distinctive each from the other.

In coders of this type various contacts are operated by means of cams mounted on an oscillating shaft, which cams rub across pushers connected to the contacts. The surfaces of the cams which rub across the pushers are thus subjected to considerable wear and this is the case even more so since the motion is oscillatory, as distinguished from continuous, as is the case with a rotating shaft. Accordingly, if oil be applied to the contacting cam surfaces, there is a pronounced tendency to rub this oil off and so should be frequently renewed.

In view of the above, it is proposed, in accordance with this invention, to provide an oiling system which will adequately lubricate the contacting parts and without producing any excess of oil which might tend to thicken and so interfere with the proper operation of the coder.

It is furthermore proposed to provide means for drawing off any slight excess of oil which might be supplied and utilizing this excess oil for lubricating a bearing of the oscillating shaft.

It is furthermore proposed to provide an oil cup which is readily accessible from the outside of the casing of the coder, and which will hold a sufficient supply of oil to suffice for a relatively long period of time as, for example, approximately one year.

Further objects, purposes, and characteristic features of the present invention will appear as the description progresses, reference being made to the accompanying drawing, showing in a wholly diagrammatic manner, and solely by way of example, one form which the invention can assume. In the drawing:

Fig. 1 is a fragmentary, vertical, sectional view of a device constructed in accordance with this invention.

Fig. 2 is a sectional view on line 2—2 of Fig. 1, and viewed in the direction of the arrows.

Fig. 3 is a sectional view on line 3—3 of Fig. 1, and viewed in the direction of the arrows.

Fig. 4 is a fragmentary, exploded view to an enlarged scale of connecting means as employed in this invention.

Fig. 5 is a sectional view, to an enlarged scale, of parts constituting a portion of this invention.

Referring to the drawing, and first to Fig. 1, there is here shown an embodiment of the invention with only those parts illustrated as appears necessary for an understanding of the present invention. The oscillating coder includes a top plate TP of suitable insulating material carrying terminal posts, as 2, to form a cover for a casing C made of suitable transparent material, as glass.

Projecting downwardly within the casing is a pair of spaced pole pieces, only one of which, 3, is shown, and constituting the electro-magnetic means for producing the oscillation of an armature 4 mounted on a vertical shaft 5, and operating as set forth in the above referred to Field application. Below the armature 4 is a biasing spring 6, arranged to be adjustable in its tension so as to vary the periodicity of the oscillations in the same manner as disclosed in the above referred to application.

Shaft 5 is mounted in suitable step bearings, one of which is in the top plate and the other of which is carried by a supporting strap 7. These bearings, as, for example, the upper bearing, includes a sleeve 9 inserted in a carry member 10, carried in top plate TP with the sleeve backed up by a ball member 11. The reduced end 12 of the shaft is received in the sleeve and can bear against the ball member 11. The lower bearing is similar in construction to the upper one, having a sleeve 14 and a ball member 15 for forming the lower thrust or step bearing.

Suitably mounted on shaft 5 are operating cams constituted by an upper cam 16, and a lower cam 17 positioned to properly cooperate, respectively, with a pusher 18 and a pair of pushers, 19 and 20, respectively. Cam 16 and its associated pusher 18 is shown in detail in Fig. 2; while cam 17 and its associated pair of pushers 19 and 20 are shown in detail in Fig. 3.

Considering first the pusher 18 and the cam 16, this pusher is connected by means of brackets $19^1$, $20^1$ and 21 to a contact finger 22, carrying a front contact 23 which cooperates with a back contact 24. This contact finger 22 is biased away from its back point, and upon cam 16 moving counter-clockwise, as viewed in Fig. 2, so as to allow pusher 18 to leave the high portion 26 of the cam and ride on the low cam portion 27, contacts 23 and 24 open. On the other hand, when cam 16 swings in a clockwise direction to bring the pusher onto the high part of the cam, the contacts are closed. These contacts are included in the energizing circuit for the electro-magnet in the same manner as fully disclosed in the patent above referred to.

The lower cam 17, as can best be seen in Fig. 3, is positioned between the two pushers 19 and 20. These pushers are connected to their contact fingers 29 and 30 in the same manner as described just above, that is, respectively, by brackets 31, 32 and 33, and brackets 34, 35 and 36.

Contact fingers 29 and 30 carry front contacts 37 and 38 which cooperate with back contacts 39 and 40, respectively.

These contacts 37, 39 and 38, 40, are shown in the normal, open positions, and are employed for coding current and placing it in a track section. Upon cam 17 turning in a counter-clockwise direction, pusher 19 rides up on the high portion $17^1$ of the cam and contact 37 closes on contact 39. Upon the cam rotating back again to its shown position and then continuing in a clockwise direction, pusher 20 rides up on the high portion $17^1$ of cam 17 to effect the closing of contact 38 on its associated contact 40.

As described in detail in the above referred to application, shaft 5 is caused to oscillate by the spring and the electro-magnet to control the contacts so as to place coded current on a track circuit. In this backward and forward motion of the cams on the pushers, a considerable amount of friction may result unless the rubbing parts be properly lubricated. Furthermore, as referred to above, due to the fact that there is an oscillatory motion rather than a continuous rotatory motion involved in the operation, any oil film on the high parts of the operating cams tends to be quickly wiped off and become dry unless constantly renewed. Accordingly, the structure considered in the following description discloses a wholly satisfactory means for effecting this lubrication and with a minimum of effort involved.

The oiling system in question includes an oil cup designated as a whole as OC. This, as shown to best advantage in Fig. 5, comprises an elongated member of square cross-section as at 41, and a reduced cylindrical section 42, threaded at its end, as at 43, and passing through an opening in the top plate, to receive a clamping nut 44 whereby to securely hold the oil cup clamped to the top plate by means of the nut 44, and the shoulder 45, formed by the square and cylindrical portions. Nut 44 extends beyond the end of the threaded portion 43 to receive a filling nipple 46, which seats in a seat 47 in the end of portion 42, and carries a suitable cover, as 48, hinged as at 49, and spring-pressed (not shown) into position in the usual manner.

The oil cup OC is held against turning in the top plate by a blocking member having one squared end 70 having its outer edge bearing against the flat face of a downwardly projecting lug 71 on the inner face of the top plate. The blocking member has a flat faced vertical leg 72 which bears against one of the square sides $72^1$ of the oil cup and is held in position by a loop member 73 encircling the cylindrical portion 42 of the cup, and clamped between the top plate and the shoulder 45 of the oil cup. In this manner the oil cup is positively held against any unintended turning motion and thus is obviated all danger of twisting the wicks or pulling them out of place.

This oil cup has a central bore 50 of relatively large diameter extending from its upper end to within a short distance of its lower end, at which point it is very much reduced as at 51 to communicate with a reduced branch 52 at right angles thereto, opening at one side of portion 41.

The portion of oil cup 41 at the outer end of bore 52 has a cut-out part $42^1$ which can be clamped in place by a screw $43^1$ and thereby clamp three oiling wicks 53, 62 and 63 in place on the member 41. The screw $43^1$ passes through the cut-out portion $42^1$ and into portion 41, and also through the three wicks whereby to clamp them securely in place against the outlet bore 52 so that outlet bore 52 opens onto the wicks and at their upper edges.

These wicks are employed for conducting oil from the oil cup to the rubbing surfaces of the operating cams. As indicated in the drawing, the wicks are made of fine fabric and are relatively broad and relatively thin. The wicks are substantially twice as wide as the width of a contact finger, as, for example, contact finger 30, and hence are folded over on themselves just beyond where they are clamped by screw $43^1$. Thus, each wick is just slightly narrower than the width of the contact fingers and of double thickness. Each wick, as 53, for example in Fig. 4, lies along the inner face of its contact finger, as 30, and then passes from the finger along a supporting angle bracket, as 54, to have its end, as 55, positioned at the junction angle of the cam, as 17, and the pusher, as 20. The wick is thin and very flexible, and in order to hold its end in the proper position, for bearing against the rubbing surface of its cam and furnish an adequate supply of oil to this surface at all times, it is held in place by an angle clamp, as 56, having double ears, only one of each pair, as 57 and 58 for each end, is clearly shown in the drawing. This angle clamp is placed over the wick whereby to position the wick between it and the bracket 56 after which the ears are bent over and pressed down firmly in place to hold the entire assembly in place as shown, for example, in Fig. 3.

It can be noted from Fig. 4, that the same rivet, as 60, which holds the brackets for connecting the pusher to the contact finger, is also employed for holding the angle bracket 54 and clamp 56 in place with the wick 53 therebetween with the wick passed through by this same rivet.

The other wicks 62 and 63 are held in place on their respective contact fingers in the same manner as described just above.

In Fig. 1, it can be seen how the wick 62 extends downwardly to the contact finger 29 where bracket 56 has its ears 58 and 57 bent around the wick to hold it against the contact finger 29 and extending bracket 54 respectively. Since the contact finger 29 is slightly wider than bracket 54, the ears 58 in extending over it appear to be slightly wider than the ears 57. The bracket 56 is held in place by rivet 60 as above mentioned and thus has bent portions to conform with the shape of the finger 29 and bracket 54 as seen in Fig. 3, and these bends are represented in Fig. 1 by the solid vertical lines immediately adjacent the rivet 60 on its opposite sides. Also, the cams are not all located on the same horizontal plane so that it is necessary for the wicks to be slanted, so to speak, to the proper level as indicated in Fig. 1, thus making slight bends in the wicks as shown in Fig. 3.

The contact fingers are carried by the top plate by means of blocks of insulating material in which they are fastened or preferably molded. For example the contact fingers 29 and 30 are carried in the blocks 63¹, which in turn is carried by a stud as 64, at each end of the block, (only one end being shown in the drawing), passing through slots 65 in the block. In this manner, the block carrying the contact fingers can be adjusted in position with respect to the top plate and accordingly with respect to the operating cam whereby to place the pushers in the proper position for the desired operating characteristics. The contact finger 22 is carried in a similar block 66, mounted on the top plate and adjustable as described above.

The shaft 5 has an oil groove 67 formed therein along its length whereby to permit any excess of oil supplied by the wicks to the cams and running downwardly to follow the lower face of the cams and onto shaft 5 to enter the oil groove 67 and thereby pass to the lower step bearing and lubricate the same. Should there be an excess of oil for the lower bearing, it can be readily removed by draining it off through an opening closed by a plug member 69.

From the above description of one form which this invention can assume, it is clear that oil from the oil cup passes through the reduced bores to the relatively fine wicks, and then along the wicks to constantly lubricate the rubbing faces of the operating cams. There is a relatively small supply of oil to the cams due to the small size of the oil outlet channel and to the fine wicks employed. With a relatively small oil cup, sufficient oil can be held therein to suffice for lubricating the oscillator satisfactorily for about one year without refilling.

As disclosed more fully in the application above referred to, the cams for operating the contacts oscillate at various rates, and at times, at various amplitudes. The cam 17, which operates the two pushers for the coding circuit, swings sufficiently in each direction to move the pushers from the low part of the cam out and onto the high part, but not off of the high part in that same direction.

The cam 16, however, which operates the contact for controlling the electro-magnet, may at times swing sufficiently far to cause the pusher to move from the low part of the cam out and onto the high part, and then off of the high part and onto the low part, while the cam continues in the same direction. With this type of operation, it can be readily understood that oiling of the rubbing parts is absolutely essential, since without it, undue wear would occur in a relatively short time, and the operation of the device would be at least impaired, as regards smoothness of operation and accuracy of timing, and might be even completely interrupted.

The oiling system here disclosed, furnishes a ready means requiring very little maintenance and involving no danger of disturbing the adjustment of the oscillator, for oiling oscillators of the type with which this invention is concerned.

The above rather specific description of one form of the invention is given solely by way of example, and is not intended, in any manner whatsoever, in a limiting sense. It is to be understood that various modifications, adaptations and alterations may be applied, from time to time, to meet the requirements of practice without, in any manner, departing from the spirit or scope of the invention, except as may be limited by the appended claims.

Having described one form of my invention, I now claim:

1. In combination with an oscillating coder having a casing enclosing a shaft, means for oscillating the shaft, a cam fixed to the shaft, a contact finger adjacent the cam, a pusher on the finger and in operative rubbing association with the cam; an oiling system including an elongated oil cup within the casing and having one end accessible from outside of the casing, a relatively large longitudinal reservoir in the cup and terminating at said one end of the cup, a relatively restricted lateral bore connecting the reservoir with a lateral face of the cup, a two-ended wick, means for detachably clamping one end of the wick against the open end of the lateral bore, and means for holding the other end of the wick in engagement with the rubbing surface of the cam and including a rigid angle bracket fastened to the contact finger, a rigid clip bracket removably fastenable to the angle bracket, the wick being held between these two brackets and having its rubbing end projecting only slightly beyond the rigid brackets.

2. In combination with an oscillating coder having a casing enclosing a shaft, means for oscillating the shaft, a plurality of cams fixed to the shaft, a contact finger adjacent each of the cams, a pusher on each finger and in operative rubbing association with its cam; an oiling system including an elongated oil cup within the casing and having one end accessible from outside of the casing, a relativeuy large longitudinal reservoir in the cup and terminating at said one end of the cup, a relatively restricted lateral bore connecting the reservoir with a lateral face of the cup, a two-ended wick for each pusher, means for detachably clamping one end of each of the wicks against the open end of the lateral bore, and means for holding the other end of each wick in engagement with the rubbing surface of its cam and including a rigid angle bracket fastened to the contact finger, a rigid clip bracket removably fastenable to the angle bracket, the wick being held between these two brackets and having its rubbing end projecting only slightly beyond the rigid brackets.

3. In combination with an oscillating coder having a casing enclosing a vertical shaft, means for oscillating the shaft, a cam fixed to the shaft, a contact finger adjacent the cam, and a pusher on the finger and in operative rubbing association with the cam; an oiling system including an oil cup having an oil reservoir and positioned within the casing and accessible for filling from the outside of the casing, a two ended oiling wick communicating at one end with the reservoir, means positioning the other end of wick against the rubbing surface of the cam, a lower step bearing for the shaft, and a longitudinal groove in the shaft extending from below the cam to the bearing for conducting any excess oil that flows from the cam over the extent of the shaft to said lower bearing.

4. In combination with an oscillating coder having a casing enclosing a shaft, means for oscillating the shaft, a cam fixed to the shaft, a contact finger adjacent the cam, and a pusher on the finger and in operative rubbing association with the cam; an oiling system including an oil cup having an oil reservoir and positioned within the casing and accessible for filling from the outside of the casing, a two ended oiling wick communicating at one end with the reservoir, and means positioning the other end of the wick against the rubbing surface of the cam, the oil cup having a flat face, terminating in a shoulder, within the casing, and a cylindrical portion extending through the casing, a rigid blocking member with a portion encircling the cylindrical portion, means outside of the casing and on the cylindrical portion for clamping the encircling portion between the casing and the shoulder, a flat portion on the blocking member lying against the flat face of the oil cup, a flat faced boss on the inner part of the casing, and a flat end portion of the blocking member bearing against the boss, whereby the blocking member prevents accidental turning of the oil cup, in the casing.

5. In a coder having a vertical shaft enclosed in a casing, means for rotating the shaft a limited amount in opposite directions alternately, a plurality of cams fixed to the shaft, a contact finger adjacent each of the cams and biased towards its cam, a pusher member on each contact finger for separating that contact finger and its cam to provide a rubbing surface against the cam whereby the associated contact finger is caused to operate with an oscillatory motion, an oil reservoir positioned within the casing and made accessible for filling with oil from the outside of the casing, a plurality of fabric wicks, one for each cam, extending from the base of said reservoir to their respective cams, means associated with each cam for holding its respective wick in close rubbing contact with the surface of the cam, and means including a single oil duct of relatively small diameter for feeding oil from said reservoir to all of said wicks at the same point of attachment to said reservoir, whereby each wick of said plurality supplies substantially the same amount of oil to its respective cam throughout the same period of time.

RALPH W. HEWES.